(12) United States Patent
Kim

(10) Patent No.: US 12,104,080 B2
(45) Date of Patent: Oct. 1, 2024

(54) ANTIBACTERIAL AND HEAT-SHIELDING COMPOSITION FOR WINDOW FILM, METHOD OF PRODUCING WINDOW FILM USING THE SAME, AND WINDOW FILM PRODUCED THEREBY

(71) Applicant: GOMS Co., LTD., Suwon-si (KR)

(72) Inventor: Byung Young Kim, Cheongju-si (KR)

( * ) Notice: Subject to any disclaimer, the term of this patent is extended or adjusted under 35 U.S.C. 154(b) by 578 days.

(21) Appl. No.: 17/510,288

(22) Filed: Oct. 25, 2021

(65) Prior Publication Data
US 2022/0315769 A1    Oct. 6, 2022

(30) Foreign Application Priority Data
Apr. 2, 2021   (KR) .................... 10-2021-0043442

(51) Int. Cl.
| | | |
|---|---|---|
| C09D 5/14 | (2006.01) | |
| B32B 7/06 | (2019.01) | |
| B32B 7/12 | (2006.01) | |
| B32B 37/10 | (2006.01) | |
| B32B 37/12 | (2006.01) | |
| C08K 3/11 | (2018.01) | |
| C08K 3/22 | (2006.01) | |
| C08K 3/30 | (2006.01) | |
| C09D 5/00 | (2006.01) | |
| C09D 133/26 | (2006.01) | |

(52) U.S. Cl.
CPC .............. *C09D 5/14* (2013.01); *B32B 7/06* (2013.01); *B32B 7/12* (2013.01); *B32B 37/10* (2013.01); *B32B 37/12* (2013.01); *C09D 5/00* (2013.01); *C09D 133/26* (2013.01); *B32B 2307/306* (2013.01); *B32B 2307/71* (2013.01); *C08K 3/11* (2018.01); *C08K 2003/2282* (2013.01); *C08K 2003/3036* (2013.01); *C08K 2201/005* (2013.01); *C08K 2201/011* (2013.01)

(58) Field of Classification Search
None
See application file for complete search history.

(56) References Cited

FOREIGN PATENT DOCUMENTS

| KR | 10-2012-0050135 | 5/2012 |
|---|---|---|
| KR | 10-2016-0074750 | 6/2016 |
| KR | 10-2016-0077563 | 7/2016 |
| KR | 10-1752847 B1 | 6/2017 |
| KR | 10-2021-0029279 | 3/2021 |

*Primary Examiner* — Robert T Butcher
(74) *Attorney, Agent, or Firm* — Revolution IP, PLLC (57) ABSTRACT

Disclosed is an antibacterial and anti-shielding composition for a window film. The composition contains: 17.0 to 19.0 parts by weight of a monomer component composed of dipentaerythritol hexaacrylate and N,N-dimethylacrylamide; 0.85 to 0.95 parts by weight of any one or more liquid compounds selected from the group consisting of diphenyl (2,4,6-trimethylbenzoyl) phosphine oxide, oligo[2-hydroxy-2-methyl-1-[4-(1-methylvinyl)phenyl]propanone], 2-hydroxy-2-methylpropiophenone, and 2,4,6-trimethylbenzophenone; 0.35 to 0.40 parts by weight of 1-hydroxycyclohexylphenylketone; 0.15 to 0.20 parts by weight of phenylbis(2,4,6-trimethylbenzoyl)phosphine oxide; 0.04 to 0.06 parts by weight of 2-propenoic acid, butyl ester; 50.0 to 78.0 parts by weight of a liquid heat-shielding agent; and 2.0 to 2.5 parts by weight of an antibacterial agent. Also disclosed are a method of producing a window film using the composition, and a window film produced thereby.

14 Claims, 9 Drawing Sheets

ANTIBACTERIAL ACTIVITY TEST PHOTOGRAPH
STRAIN 2:#1

ANTIBACTERIAL AND HEAT-SHIELDING COMPOSITION FOR WINDOW FILM, METHOD OF PRODUCING WINDOW FILM USING THE SAME, AND WINDOW FILM PRODUCED THEREBY

CROSS-REFERENCE TO RELATED APPLICATION

This patent application claims priority under 35 U.S.C. § 119 to Korean Patent Application No. 10-2021-0043442 filed on Apr. 2, 2021, the entire contents of which are incorporated by reference herein.

TECHNICAL FIELD

The present invention relates to an antibacterial and heat-shielding composition for a window film, a method of producing a window film using the same, and a window film produced thereby, and more particularly to a composition for a window film, which may exhibit both excellent antibacterial activity and heat-shielding performance as a result of maximizing the compatibility between a heat-shielding material and an antibacterial agent, unlike a conventional window film in which a heat-shielding layer and an antibacterial layer are formed as separate layers, a method of producing a window film using the composition, and a window film produced thereby.

BACKGROUND

In general, a window for a building, a vehicle, an exhibition structure or the like is composed of a transparent glass plate or resin plate that transmits sunlight. However, sunlight includes ultraviolet and near-infrared rays in addition to visible rays.

Ultraviolet rays included in sunlight cause sunburn, and have adverse effects on the human body. In addition, it is well known that ultraviolet rays cause the deterioration of a packaging material, thereby causing the deterioration of the content packaged by the package material.

Meanwhile, near-infrared rays included in sunlight cause a rise in the indoor temperature due to direct sunlight, thereby reducing a cooling effect in summer.

Therefore, in order to avoid such undesirable situations, a window film, such as a solar shading film which shields ultraviolet-rays or near-infrared rays, is used for attachment to a glass window of a building or a vehicle. This window film is attached to a window of a building or vehicle by an adhesive.

Figure 1:
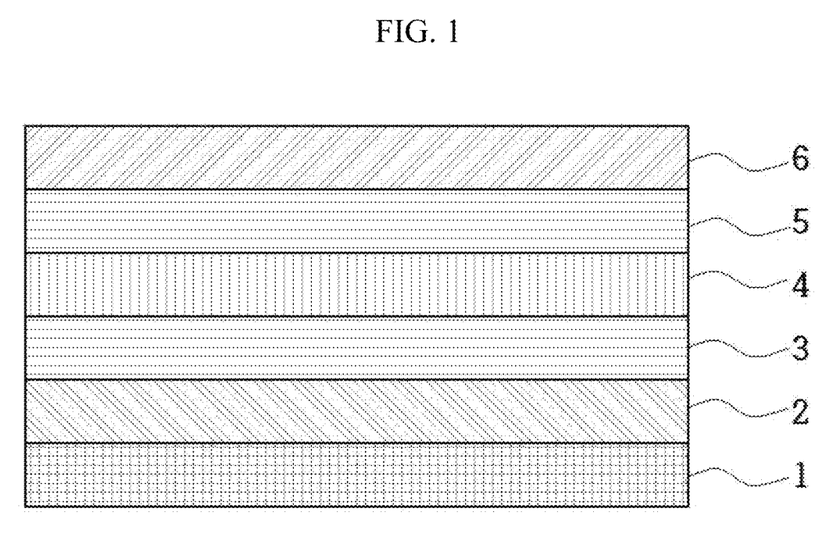
FIG. 1 is a sectional view illustrating the configuration of a conventional window film.

As shown in FIG. 1, an example of a conventional window film is composed of: a release layer 1; a UV-shielding adhesive layer 2 deposited on the release layer 1; a first transparent base film layer 3 deposited on the UV-shielding adhesive layer 2; a color coating layer 4 deposited on the first transparent base film layer 3; a second transparent base film layer 5 deposited on the color coating layer 4; and a heat-shielding hard coating layer 6 deposited on the second transparent base film layer 5.

In order to add an antibacterial coating layer coated with an antibacterial material to this conventional heat-shielding window film, the heat-shielding hard coating layer 6 may be replaced with an antibacterial coating layer, thus producing a window film composed of the following layers: a release layer 1; a UV-shielding adhesive layer 2 deposited on the release layer 1; a first transparent base film layer 3 deposited on the UV-shielding adhesive layer 2; a color coating layer 4 deposited on the first transparent base film layer 3; a second transparent base film layer 5 deposited on the color coating layer 4; and an antibacterial coating layer 6 deposited on the second transparent base film layer 5. In this case, a problem may arise in that the heat shielding properties of the window film are deteriorated.

In addition, in order to prevent deterioration in the heat shielding properties of the window film, the color coating layer 3 may be replaced with a heat-shielding coating layer and the hard coating layer 1 may be replaced with an antibacterial coating layer, thus producing a window film composed of the following layers: a release layer 1; a UV-shielding adhesive layer 2 deposited on the release layer 1; a first transparent base film layer 3 deposited on the UV-shielding adhesive layer 2; a heat-shielding coating layer 4 deposited on the first transparent base film layer 3; a second transparent base film layer 5 deposited on the heat-shielding coating layer 4; and an antibacterial coating layer 6 deposited on the second transparent base film layer 5. In this case, problems arise in that the visible light transmittance of the window film increases and the window film cannot change color.

In addition, in order to prevent the visible light transmittance from increasing, a window composed of the following layers may be produced: a release layer 1; a UV-shielding adhesive layer 2 deposited on the release layer 1; a first transparent base film layer 3 deposited on the UV-shielding adhesive layer 2; a heat-shielding coating layer 4 deposited on the first transparent base film layer 3; a color base film layer 5 deposited on the heat-shielding coating layer 4; and an antibacterial coating layer 6 deposited on the color base film layer 5. In this case, problems arise in that the window film cannot change color and the color base film layer is decolored.

Figure 2:
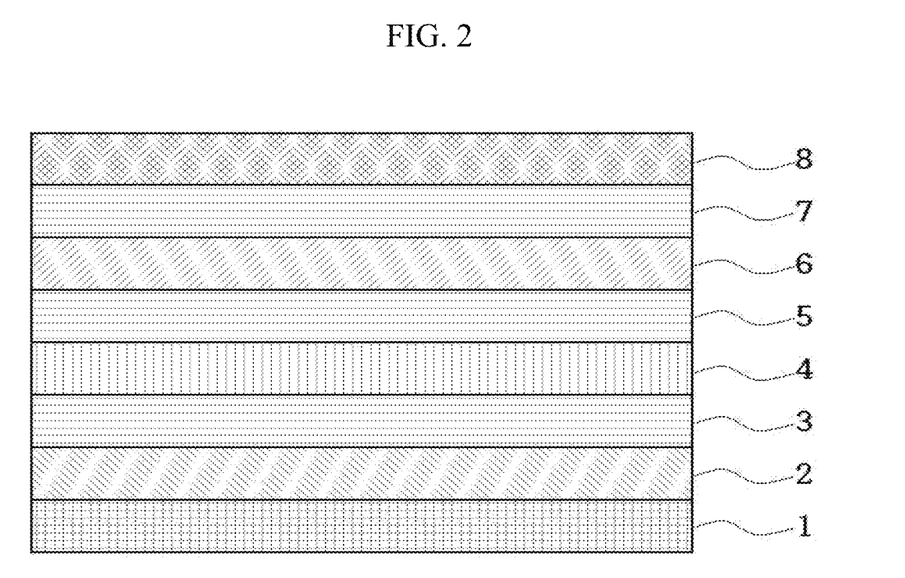
FIG. 2 is a sectional view illustrating the configuration of a conventional window film further including an antibacterial coating layer.

In addition, as shown in FIG. 2, an antibacterial coating layer may be added to the conventional window film, thus producing a window film composed of the following layers: a release layer 1; a UV-shielding adhesive layer 2 deposited on the release layer 1; a first transparent base film layer 3 deposited on the UV-shielding adhesive layer 2; a color coating layer 4 deposited on the first transparent base film layer 3; a second transparent base film layer 5 deposited on the color coating layer 4; a heat-shielding coating layer 6 deposited on the second transparent base film layer 5; a third transparent base film layer 7 deposited on the heat-shielding coating layer 6; and an antibacterial coating layer 8 deposited on the third transparent base film layer 7. In this case, problems arise in that since the third transparent base film layer is added and the heat-shielding coating layer and the antibacterial coating layer are formed as separate layers, the production process is complex, the production time is long, and the production cost increases.

SUMMARY

Accordingly, the present invention has been conceived to overcome the disadvantages of the process of producing the conventional window film, including a complicated production process, a long production time, and an increased production cost, which occur because the heat-shielding layer and the antibacterial coating layer are formed as separate layers, and an object of the present invention is to provide an antibacterial and heat-shielding composition for a window film, which allows the antibacterial layer and the heat-shielding layer to be formed as a single layer without being formed as separate layers while allowing the produced window film to have heat-shielding performance and low haze.

Another object of the present invention is to provide a method of producing a window film using the antibacterial and heat-shielding composition, and a window film produced thereby.

To achieve the above objects, the present invention provides an antibacterial and heat-shielding composition for a window film, the composition containing: 17.0 to 19.0 parts by weight of a monomer component composed of dipentaerythritol hexaacrylate and N,N-dimethylacrylamide; 0.85 to 0.95 parts by weight of any one or more liquid compounds selected from the group consisting of diphenyl(2,4,6-trimethylbenzoyl) phosphine oxide, oligo[2-hydroxy-2-methyl-1-[4-(1-methylvinyl)phenyl] propanone], 2-hydroxy-2-methylpropiophenone, and 2,4,6-trimethylbenzophenone; 0.35 to 0.40 parts by weight of 1-hydroxycyclohexylphenylketone; 0.15 to 0.20 parts by weight of phenylbis(2,4,6-trimethylbenzoyl)phosphine oxide; 0.04 to 0.06 parts by weight of 2-propenoic acid, butyl ester; 50.0 to 78.0 parts by weight of a liquid heat-shielding agent; and 2.0 to 2.5 parts by weight of an antibacterial agent.

In this case, the monomer component may be a mixture of dipentaerythritol hexaacrylate and N,N-dimethylacrylamide mixed together at a weight ratio of 85 to 95:5 to 15.

In this case, the heat-shielding agent may be either a liquid antimony tin oxide in which solids having a particle size of 50 nm or smaller are nanodispersed, or a liquid cesium tungsten oxide in which solids having a particle size of 50 nm or smaller are nanodispersed.

In this case, the content of the solids having a particle size of 50 nm or smaller in the liquid antimony tin oxide may be 35 to 45 wt %.

In this case, the content of the solids having a particle size of 50 nm or smaller in the liquid cesium tungsten oxide may be 30 to 40 wt %.

In this case, the antibacterial agent may include zinc sulfide (ZnS).

The present invention also provides a method for producing a window film, the method including steps of: (1) forming a laminated half-finished film by forming a pigment adhesive layer on one surface of a first base film and depositing a second base film on the pigment adhesive layer, followed by pressing with a laminating roller; (2) forming an antibacterial and heat-shielding hard coating layer by coating one surface of the half-finished film with an antibacterial and heat-shielding solution; (3) forming a UV-shielding adhesive layer by adhering a UV-shielding layer to an exposed surface of the antibacterial and heat-shielding hard coating layer; and (4) depositing and laminating a release layer onto the top surface of the UV-shielding adhesive layer.

The present invention also provides a window film which is produced by the above method and in which an antibacterial and heat-shielding hard coating layer, a first base film layer, a pigment adhesive layer, a second base film layer, a UV-shielding adhesive layer and a release layer are sequentially laminated together in this order and the antibacterial and heat-shielding hard coating layer is formed as a single layer.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

The present invention will be described in more detail below.

The present invention is intended to provide a composition for a window film, which has both excellent antibacterial activity and heat-shielding performance so that an antibacterial layer and a heat-shielding layer may be formed as a single layer, unlike a conventional window film in which the antibacterial layer and the heat-shielding layer are formed as separate layers, a method of producing a window film using the composition, and a window film produced by the method.

More specifically, the composition for a window film having both antibacterial activity and heat-shielding performance according to the present invention is characterized by containing:

17.0 to 19.0 parts by weight of a monomer component composed of dipentaerythritol hexaacrylate and N,N-dimethylacrylamide;

0.85 to 0.95 parts by weight of any one or more liquid compounds (hereinafter referred to as KTO-46) selected from the group consisting of diphenyl(2,4,6-trimethylbenzoyl) phosphine oxide, oligo[2-hydroxy-2-methyl-1-[4-(1-methylvinyl)phenyl]propanone], 2-hydroxy-2-methylpropiophenone, and 2,4,6-trimethylbenzophenone;

0.35 to 0.40 parts by weight of 1-hydroxycyclohexylphenylketone;

0.15 to 0.20 parts by weight of phenylbis(2,4,6-trimethylbenzoyl)phosphine oxide;

0.04 to 0.06 parts by weight of 2-propenoic acid, butyl ester;

50.0 to 78.0 parts by weight of a liquid heat-shielding agent; and 2.0 to 2.5 parts by weight of an antibacterial agent.

According to the present invention, the monomer component of the composition is a liquid base resin having high viscosity. Preferably, the monomer component is a mixture of dipentaerythritol hexaacrylate and N,N-dimethylacrylamide mixed together at a weight ratio of 85 to 95:5 to 15. If the monomer component is used in an amount of more than 19.0 parts by weight, a problem may arise in that, when one surface of the base film is coated with the composition, the cured state is unstable and the product curls may be severe, and if the monomer component is used in an amount of more than 17.0 parts by weight, problems such as cracks and film exfoliation may occur due to a decrease in the bonding strength of the hard coating.

According to the present invention, KTO-46, 1-hydroxycyclohexylphenylketone, and phenylbis(2,4,6-trimethylbenzoyl)phosphine oxide are photoinitiators, and when they are added in predetermined amounts, the monomer component undergoes a radical reaction upon UV irradiation to form a polymer. If each of the photoinitiators is used in an amount larger than the upper limit of the above-specified range, a problem may arise in that the generation of monomers during curing after hard coating increases, thereby reducing the bonding strength, and if each photoinitiator is used in an amount smaller than the lower limit of the above-specified range, a problem may arise in that the time of curing after hard coating is long or the composition is not easily cured.

According to the present invention, the 2-propenoic acid, butyl ester is a dispersibility improving additive which is added to improve the slip property and dispersibility of the composition. If the 2-propenoic acid, butyl ester is added in an amount of more than 0.06 parts by weight, problems may arise in that the surface slip is excessive and the product haze increases, and if the 2-propenoic acid, butyl ester is added in an amount of 0.04 parts by weight, problems may arise in that blocking occurs due to insufficient surface slip and the coating appearance is deteriorated.

According to the present invention, the liquid heat-shielding agent is an additive that is used to ensure the heat shielding rate of the composition. In the present invention, the liquid heat-shielding agent may be any one or more selected from among a liquid antimony tin oxide and a liquid cesium tungsten oxide.

The liquid antimony tin oxide is one in which solids having a particle size of 50 nm or smaller are nanodispersed in an organic solvent (such as methyl ethyl ketone), and the content of the solids is preferably 35 to 45 wt %.

In addition, the liquid cesium tungsten is one in which solids having a particle size of 50 nm or smaller are nanodispersed in an organic solvent (such as methyl ethyl ketone), and the content of the solids is preferably 30 to 40 wt %.

In this case, the heat-shielding agent selected from among the liquid antimony tin oxide and the liquid cesium tungsten oxide is one in which solids having a particle size of 50 nm or smaller are nanodispersed in an organic solvent (such as methyl ethyl ketone). When this heat-shielding agent is used, it is possible to prevent the haze of the composition from increasing, by maximizing the compatibility of the heat-shielding agent with the antibacterial agent so that agglomeration does not occur.

If the heat-shielding agent is added in an amount of more than 78.0 parts by weight, problems may arise in that not only the durability of the hard coating is lowered, but also cracks occurs in the hard coating layer, and if the heat-shielding agent is added in an amount of less than 50.0 parts by weight, a problem may arise in that the heat shielding effect thereof is lowered due to the lack of the required heat-shielding property.

In addition, if the content of the solids in the liquid antimony tin oxide is less than 35 wt % or the content of the solids in the cesium tungsten oxide is less than 30 wt %, there is a disadvantage in that it is difficult for a user to design a heat-shielding film having a heat-blocking property, due to the excessive addition of organic solvent compared to the monomer component. On the other hand, the content of the solids in the liquid antimony tin oxide is more than 45 wt % or the content of the solids in the liquid cesium tungsten oxide is more than 40 wt %, there is a disadvantage in that the haze of the finished product increases because it is difficult to manage the dispersed particles of the solids.

It is possible to design the heat-shielding film recipe by controlling the amount of each heat-shielding additive added within the above-specified range in proportion to the monomer component serving as the base resin.

According to the present invention, the antibacterial agent includes zinc sulfide (ZnS). Preferably, the antibacterial agent which is contained in the composition is a solution having a solid content of 5 wt %, prepared by dissolving zinc sulfide in an organic solvent (alcohol) and an acid (salicylic acid (O-carboxyphenol)). If the antimicrobial agent is used in an amount of less than 2.0 parts by weight, a problem may arise in that the antibacterial activity of the composition is lowered, and if the antibacterial agent is added in an amount of more than 2.5 parts by weight, a problem may arise in that the optical properties of the composition change and the appearance of the composition deteriorates.

The present invention also provides a method of producing a window film, in which an antibacterial layer and a heat-shielding layer are formed as a single layer, by using the composition for a window film having excellent antibacterial activity and heat-shielding performance.

Figure 4:
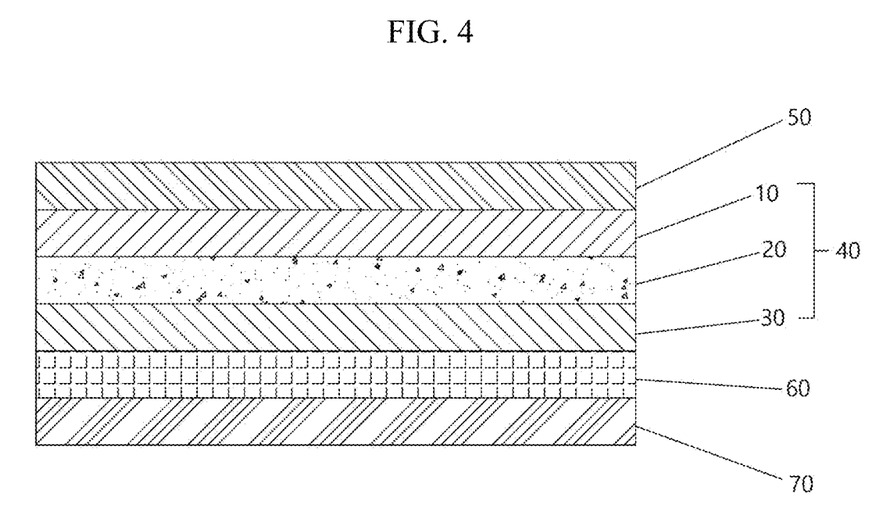
FIG. 4 is a sectional view of a window film according to the present invention.

As shown in FIG. 4, the method for producing a window film according to the present invention includes steps of: (1) forming a laminated half-finished film 40 by forming a pigment adhesive layer 20 on one surface of a first base film 10 and depositing a second base film 30 on the pigment adhesive layer 20, followed by pressing with a laminating roller; (2) forming an antibacterial and heat-shielding hard coating layer 50 by coating one surface of the half-finished film 40 with an antibacterial and heat-shielding solution; (3) forming a UV-shielding adhesive layer 60 by adhering a UV-shielding layer to an exposed surface of the antibacterial and heat-shielding hard coating layer 50; and (4) depositing and laminating a release layer 70 onto the top surface of the UV-shielding adhesive layer 60.

Figure 3:
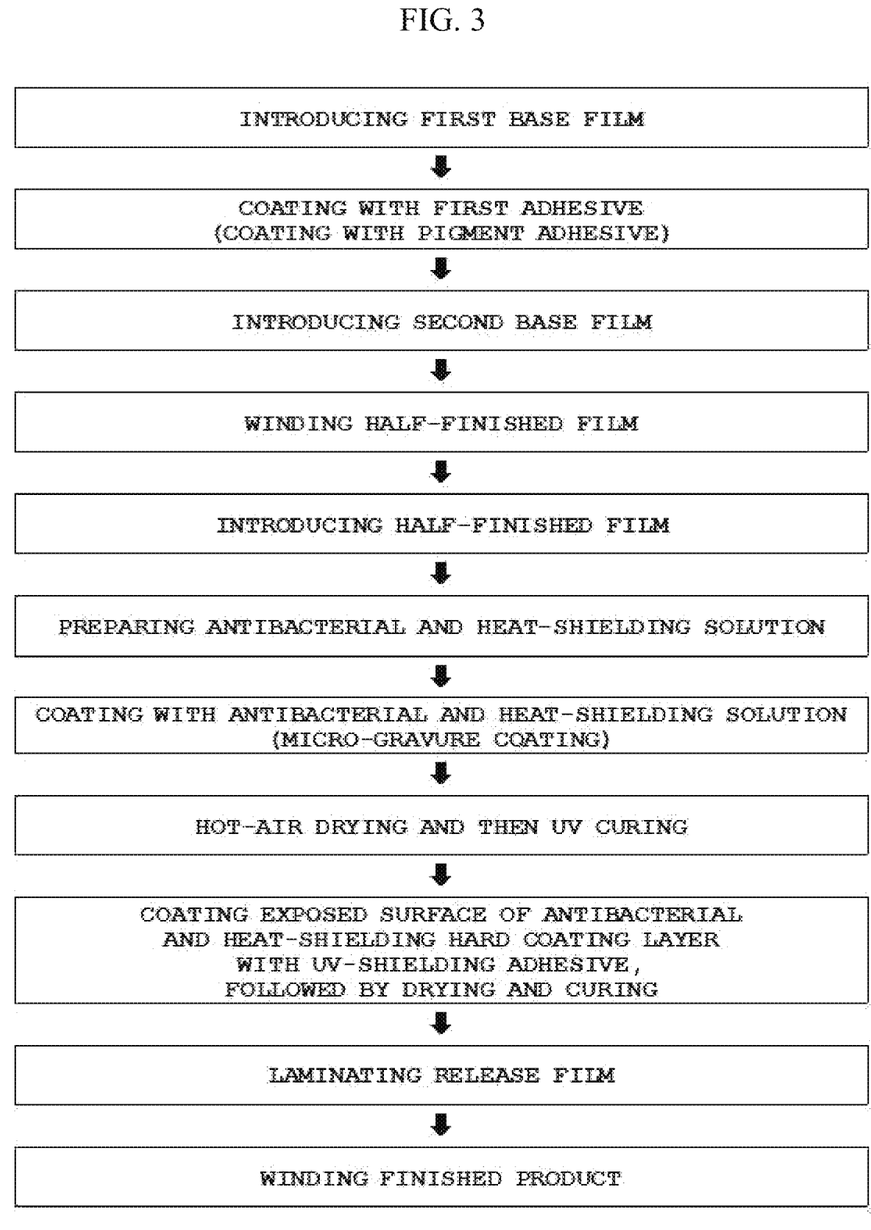
FIG. 3 is a block diagram showing a process of producing a window film according to one embodiment of the present invention.

More specifically, referring to FIGS. 3 and 4, the first base film 10 is supplied and transferred by means of a guide roller, and the pigment adhesive layer 20 is formed on one surface of the first base film 10. The second base film 30 is deposited on an exposed surface of the pigment adhesive layer 20 and pressed with a laminating roller to form a laminated half-finished film 40 which is then wound.

In this case, the pigment adhesive layer 20 is formed by coating with an adhesive obtained by adding an inorganic pigment (having a particle size of 50 nm or less) to an adhesive which is commonly used in film adhesion. In this case, the color and visible light shielding rate of the composition may be designed according to the type of inorganic pigment used.

According to the present invention, each of the first and second base films used in step (1) is preferably a highly transparent PET film having a haze of about 1.0.

While the wound semi-finished film 40 is transferred by a guide roller, one surface thereof is coated with an antibacterial and heat-shielding solution to form the antibacterial and heat-shielding hard coating layer 50.

Preferably, the process of forming the antibacterial and heat-shielding hard coating layer 50 includes steps of: preparing an antibacterial and heat-shielding solution; forming an antibacterial and heat-shielding solution layer by coating one surface of the half-finished film 40 with the antibacterial and heat-shielding solution by a micro-gravure coating method; hot-air-drying the formed antibacterial and heat-shielding solution layer by passage through a dryer; and performing UV curing after the hot air drying.

After the antibacterial and heat-shielding hard coating layer 50 is formed, the UV-shielding adhesive layer 60 is formed by applying a UV-shielding adhesive to an exposed surface of the antibacterial and heat-shielding hard coating layer 50, and then the release layer 70 is deposited and laminated onto the top surface of the UV-shielding adhesive layer 60, followed by winding on a winding roll.

In this case, the UV-shielding adhesive used is obtained by adding a UV-shielding agent to a transparent adhesive. In the present invention, a benzotriazole-based UV absorber is preferably used.

According to the present invention, the antibacterial and heat-shielding solution used in step (2) is preferably a solution containing: 17.0 to 19.0 parts by weight of a monomer component composed of dipentaerythritol hexaacrylate and N,N-dimethylacrylamide; 0.85 to 0.95 parts by weight of any one or more liquid compounds selected from the group consisting of diphenyl(2,4,6-trimethylbenzoyl) phosphine oxide, oligo[2-hydroxy-2-methyl-1-[4-(1-methylvinyl)phenyl]propanone], 2-hydroxy-2-methylpropiophenone, and 2,4,6-trimethylbenzophenone; 0.35 to 0.40 parts by weight of 1-hydroxycyclohexylphenylketone; 0.15 to 0.20 parts by weight of phenylbis(2,4,6-trimethylbenzoyl)phosphine oxide); 0.04 to 0.06 parts by weight of 2-propenoic acid, butyl ester; 50.0 to 78.0 parts by weight of a liquid heat-shielding agent; and 2.0 to 2.5 parts by weight of an antibacterial agent.

In this case, the monomer component is preferably a mixture of dipentaerythritol hexaacrylate and N,N-dimethylacrylamide mixed together at a weight ratio of 85 to 95:5 to 15.

The liquid heat-shielding agent is an additive that is used to ensure the heat shielding rate of the composition. In the present invention, the liquid heat-shielding agent may be any one or more selected from among a liquid antimony tin oxide and a liquid cesium tungsten oxide.

The liquid antimony tin oxide is one in which solids having a particle size of 50 nm or smaller are nanodispersed in an organic solvent (such as methyl ethyl ketone), and the content of the solids therein is 35 to 45 wt %.

In addition, the liquid cesium tungsten is one in which solids having a particle size of 50 nm or smaller are nanodispersed in an organic solvent (such as methyl ethyl ketone), and the content of the solids therein is 30 to 40 wt %.

In addition, the antibacterial agent includes zinc sulfide (ZnS). Preferably, the antibacterial agent is a solution having a solid content of 5 wt %, prepared by dissolving zinc sulfide in an organic solvent (alcohol) and an acid (salicylic acid (O-carboxyphenol)).

Various problems occurring when the components of the antibacterial and heat-shielding solution are used in amounts deviating from the above-specified ranges are as described above with respect to the antibacterial and heat-shielding composition for a window film according to the present invention.

As shown in FIG. 4, the method for producing a window film according to the present invention may provide a window film in which the antibacterial and heat-shielding hard coating layer 50, the first base film layer 10, the pigment adhesive layer 20, the second base film layer 30, the UV-shielding adhesive layer 60, and the release layer 70 are sequentially laminated in this order.

Hereinafter, preferred embodiments of the present invention will be described with reference to experimental examples. However, the experimental examples described below are intended to help easily understand the present invention, and the scope of the present invention is not limited to the following experimental examples. The present invention may be modified by those skilled in the art without departing from the scope of the appended claims.

As an antibacterial and heat-shielding composition for a window film according to the present invention, an antibacterial and heat-shielding solution having the composition shown in Table 1 below was prepared.

TABLE 1

| Component | Content (parts by weight) |
| --- | --- |
| (1) Monomer component | 18.360 |
| (2) Photoinitiator | 0.920 |
| (3) Photoinitiator 2 | 0.370 |
| (4) Photoinitiator 3 | 0.180 |
| (5) Dispersibility-improving additive | 0.050 |
| (6) Heat-shielding additive 1 | 40.060 |
| (7) Heat-shielding additive 2 | 37.860 |
| (8) Antibacterial agent | 2.200 |

(1) Monomer component: a mixture of dipentaerythritol hexaacrylate and N,N-dimethylacrylamide mixed together at a weight ratio of 90:10;
(2) Photoinitiator 1: oligo[2-hydroxy-2-methyl-1-[4-(1-methylvinyl)phenyl]propanone];
(3) Photoinitiator 2: 1-hydroxycyclohexylphenylketone
(4) Photoinitiator 3: phenylbis(2,4,6-trimethylbenzoyl) phosphine oxide;
(5) Dispersibility-improving additive: 2-propenoic acid, butyl ester;
(6) Heat-shielding additive 1: liquid antimony tin oxide;
(7) Heat-shielding additive 2: liquid cesium tungsten oxide; and
(8) Antibacterial agent: a solution having a solid content of 5 wt %, prepared by dissolving zinc sulfide in an organic solvent (alcohol) and an acid (salicylic acid (O-carboxyphenol)).

<Composition of Antibacterial and Heat-Shielding Solution>

Components (2), (3), (4) and (5) in Table 1 were weighed and placed in a container, and compound (6) was weighed and added thereto. Then, the components were completely dissolved by sufficient stirring. Additionally, component (7) was weighed and added to the solution, and component (8) was weighed and added to the solution. Then, component (1) was weighed and added to the solution, followed by sufficient stirring, thereby preparing an antibacterial and heat-shielding solution.

<Production of Window Film>

A highly transparent PET film having a haze of about 1.0 was prepared as each of a first base film and a second base film. A pigment additive prepared by adding an inorganic pigment (black, blue, red or yellow) having a particle size of 50 nm or less to an urethane type additive was applied to the bottom surface of the first base film to form a pigment adhesive layer. The second base film was deposited on the pigment adhesive layer and pressed by a laminating roller, thus preparing a laminated half-finished base film.

The top surface of the base film was coated with the prepared antibacterial and heat-shielding solution by a micro-gravure coating method. The coated solution was hot-air-dried in a hot air dryer at a temperature of 60 to 100° C. at a line speed of 20 to 30 m/min, and then UV-cured with a UV curing device at 150 mJ or more, thus forming an antibacterial and heat-shielding hard coating layer.

After the antibacterial and heat-shielding hard coating layer was formed, a UV-shielding adhesive containing a benzotriazole-based UV absorber was applied to an exposed surface of the antibacterial and heat-shielding hard coating layer to form a UV-shielding layer. Then, a silicone-coated release film was deposited on the top surface of the UV-shielding layer to form a release film layer, thereby producing a window film.

The produced window film was cut to a size of 50 mm (width)×50 mm (length), thus preparing a sample.

<Test for Physical Properties>

1. Test for Optical Properties

Figure 5:
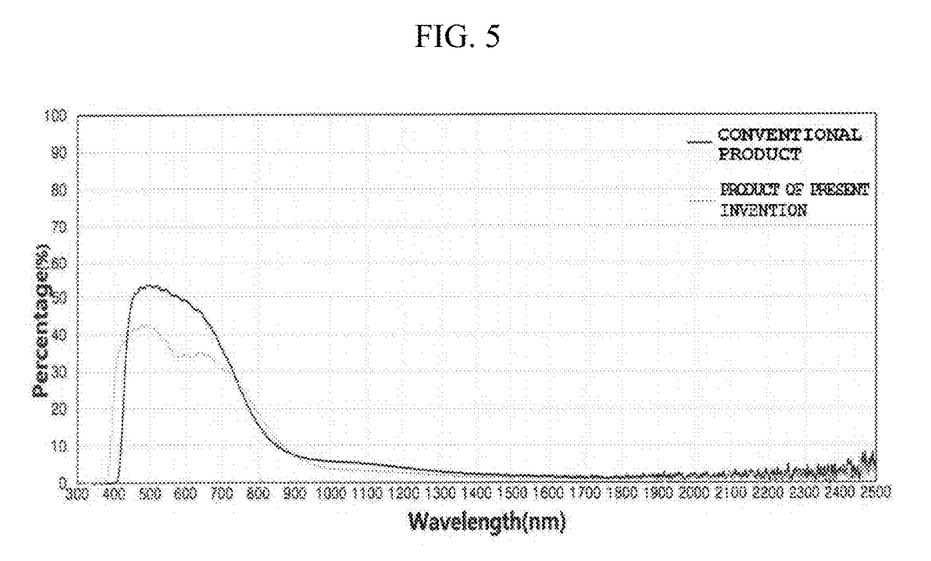
FIG. 5 is a graph showing the results of tests performed compare the optical properties of the window film according to the present invention with those of a conventional product.
Figure 6:
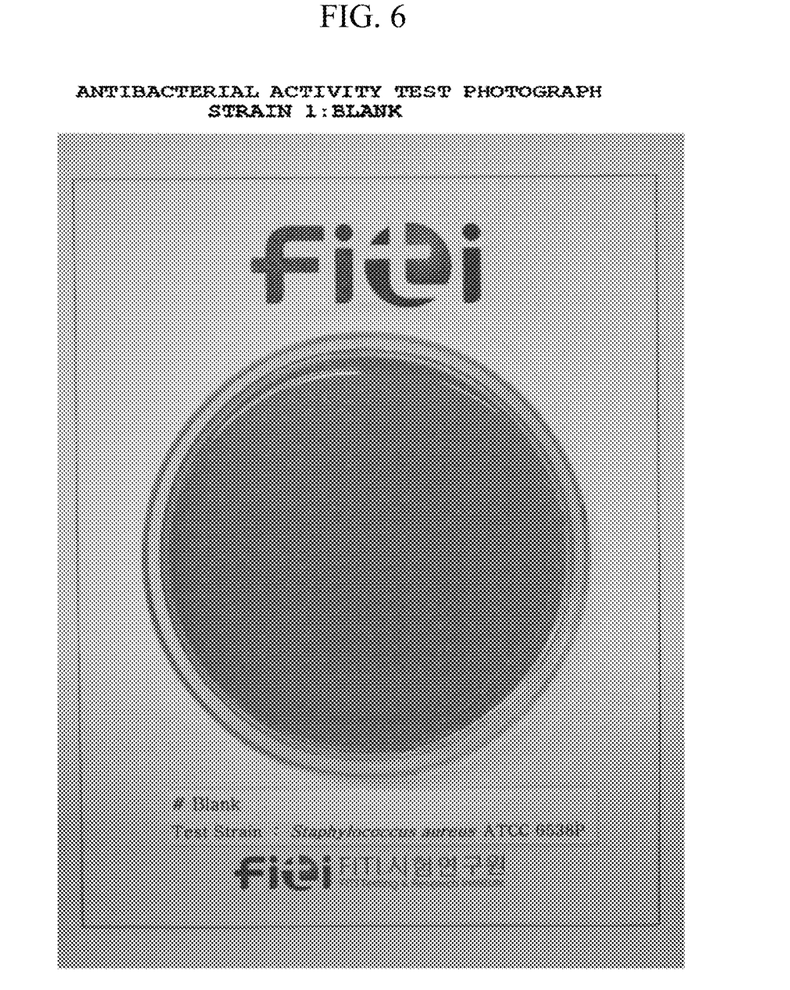
FIGS. 6 to 9 are photographs showing the results of testing the antibacterial activity of the window film according to the present invention.
Figure 7:
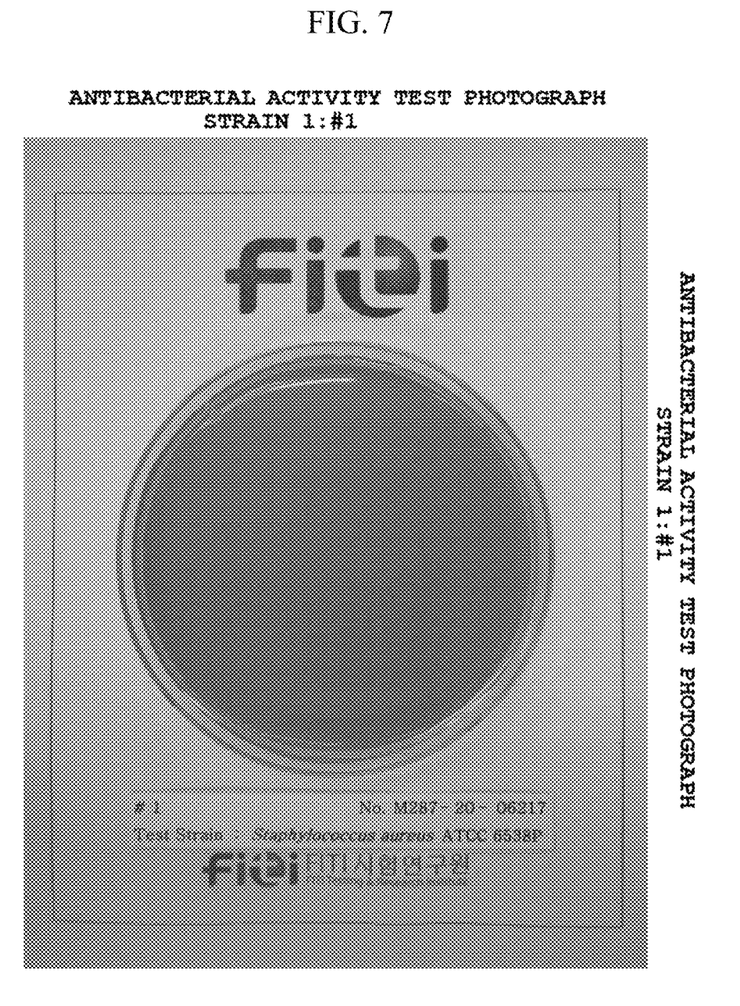
Figure 8:
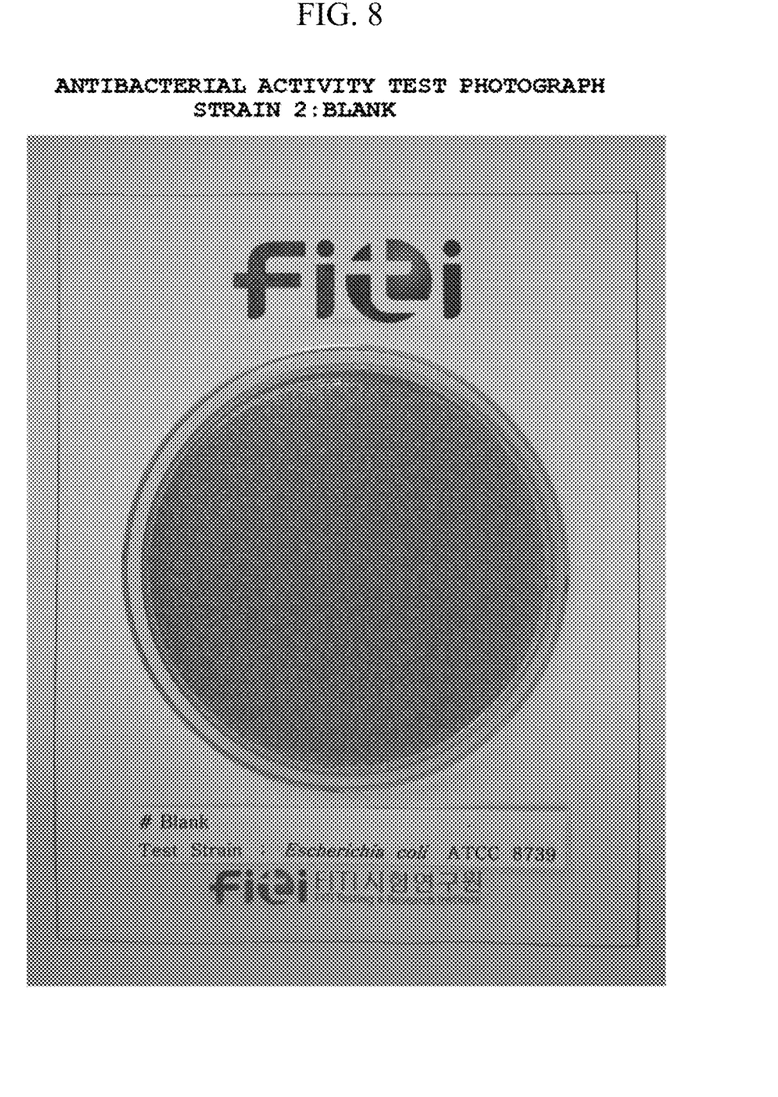
Figure 9:
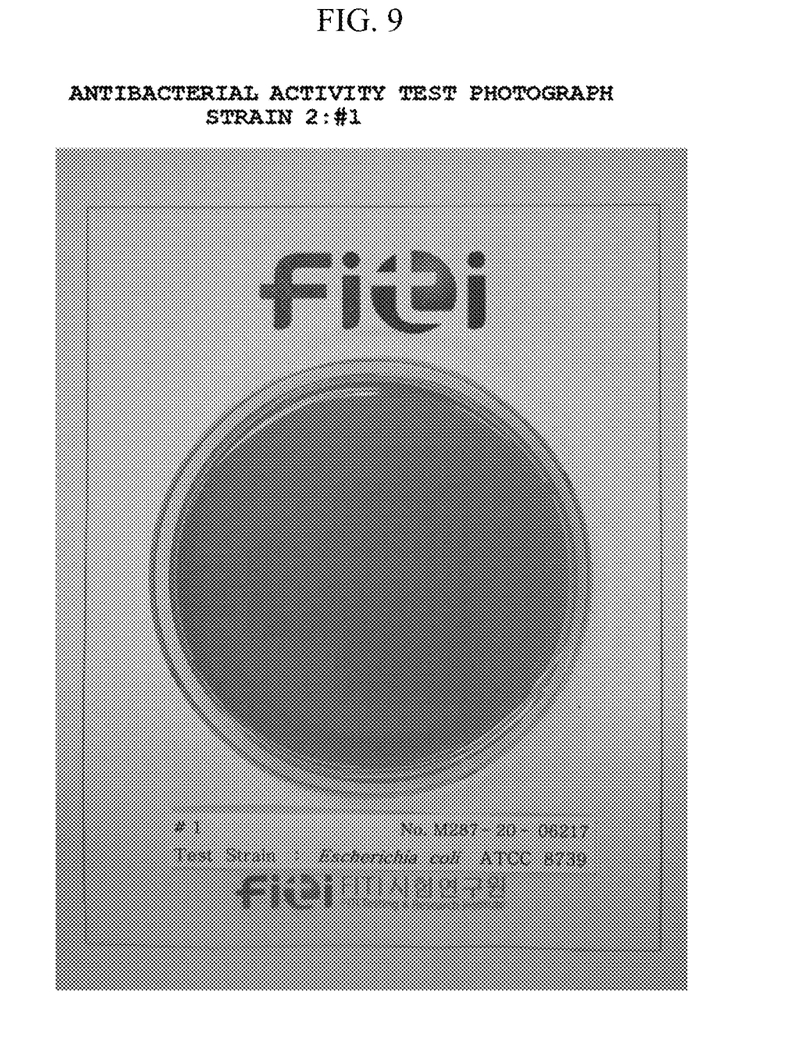

For comparison with the prepared window film sample, a conventional product (manufactured by Techpia Co., Ltd.) was prepared. As optical properties, the IR shielding performance of each of the window film sample and the conventional art was measured by a spectrophotometer, and the haze characteristic thereof was measured. The results of the measurement are shown in Table 2 below and FIG. 5.

TABLE 2

| Item | Conventional product | Sample of the present invention |
|---|---|---|
| IR shielding performance | 95% | 95% |
| Haze | 1.0 ± 0.1 | 1.0 ± 0.1 |

From the results in Table 2 above, it could be seen that even when the antibacterial layer and the heat-shielding layer were formed as a single layer according to the present invention, the heat shielding (IR shielding) and haze characteristic of the window film sample of the present invention were comparable to those of the conventional product.

This indicates that the heat shielding (IR shielding) and haze characteristic of the window film including the single antibacterial and heat-shielding hard coating layer formed by adding the antibacterial additive and the heat-shielding additive without forming an antibacterial layer and a heat-shielding layer as separate layers are comparable to those of the conventional product.

2. Test for Antibacterial Activity

According to ISO 22196:2011 test standard, the antibacterial activity of the prepared window film sample was tested, and the results of the test are shown in Table 3 below and FIGS. 6 to 9.

TABLE 3

| 01. Antibacterial activity (ISO 22196:2011): cells/cm², antibacterial activity value: log | | | |
|---|---|---|---|
| | | Blank | #1 |
| Strain 1 | Number of cells immediately after inoculation | 1.0 × 10⁴ | — |
| | Number of cells after 24 hours | 2.5 × 10⁴ | <0.63 |
| | Antibacterial activity value | — | 4.5 |
| Strain 2 | Number of cells immediately after inoculation | 1.0 × 10⁴ | — |
| | Number of cells after 24 hours | 9.4 × 10⁵ | <0.63 |
| | Antibacterial activity value | — | 6.1 |

Notes)
Standard film: Stomacher ® 400 POLY-BAG
Sample size: 50 mm × 50 mm
Cover film size: 40 mm × 40 mm
Amount inoculated: 0.4 mL
Test conditions: cell counting after stationary culturing of each test strain at 35 ± 1° C. and 90% relative humidity for 24 hours
Test strains used:
strain 1: *Staphylococcus aureus* ATCC 6538p
strain 2: *Escherichia coli* ATCC 8739

From the results in Table 3 above, it could be seen that the window film of the present invention showed an antibacterial activity value of 4.5 against strain 1 (*Staphylococcus aureus*) and an antibacterial activity value of 6.1 against strain 2 (*Escherichia coli*), suggesting that it has an antibacterial activity of 99.99% or higher compared to the standard film (blank).

The composition for a window film provided according to the present invention may exhibit excellent coating appearance and optical properties (low haze) as a result of nanodispersing the heat-shielding additive and maximizing the compatibility between the heat-shielding additive and the antibacterial agent to eliminate agglomeration thereof. In addition, when a window film is produced using the composition, the antibacterial layer and the heat-shielding layer may be formed as a single layer without being formed as separate layers, and thus the composition of the present invention can overcome the disadvantage of the conventional process for producing a window film. Furthermore, the composition of the present invention may effectively provide a simpler production process than the conventional complicated production process.

In addition, the present invention may provide the effects of shortening the production time and reducing the production cost, by improving the production process.

In addition, in the window film, which is a finished product provided according to the present invention, the antibacterial layer and the heat-shielding layer are formed as a single layer without being formed as separate layers. Nevertheless, the window film has excellent heat-shielding performance, has low haze, and has both excellent antibacterial activity and heat-shielding performance.

Although the present invention has been described in detail with the experimental examples, but the present invention is not limited to the above experimental examples, and various modifications and changes may be made by those skilled in the art without departing from the technical spirit and scope of the present invention.

What is claimed is:

1. An antibacterial and heat-shielding composition for a window film, the composition containing:
    17.0 to 19.0 parts by weight of a monomer component composed of dipentaerythritol hexaacrylate and N,N-dimethylacrylamide;
    0.85 to 0.95 parts by weight of any one or more liquid compounds selected from the group consisting of diphenyl(2,4,6-trimethylbenzoyl) phosphine oxide, oligo[2-hydroxy-2-methyl-1-[4-(1-methylvinyl)phenyl]propanone], 2-hydroxy-2-methylpropiophenone, and 2,4,6-trimethylbenzophenone;
    0.35 to 0.40 parts by weight of 1-hydroxycyclohexylphenylketone;
    0.15 to 0.20 parts by weight of phenylbis(2,4,6-trimethylbenzoyl)phosphine oxide;
    0.04 to 0.06 parts by weight of 2-propenoic acid, butyl ester;
    50.0 to 78.0 parts by weight of a liquid heat-shielding agent; and
    2.0 to 2.5 parts by weight of an antibacterial agent.

2. The antibacterial and heat-shielding composition of claim 1, wherein the monomer component is a mixture of dipentaerythritol hexaacrylate and N,N-dimethylacrylamide mixed together at a weight ratio of 85 to 95:5 to 15.

3. The antibacterial and heat-shielding composition of claim 1, wherein the liquid heat-shielding agent comprises one or more of a liquid antimony tin oxide in which solids having a particle size of 50 nm or smaller are nanodispersed, and a liquid cesium tungsten oxide in which solids having a particle size of 50 nm or smaller are nanodispersed.

4. The antibacterial and heat-shielding composition of claim 3, wherein a content of the solids having a particle size of 50 nm or smaller in the liquid antimony tin oxide is 35 to 45 wt %.

5. The antibacterial and heat-shielding composition of claim 3, wherein a content of the solids having a particle size of 50 nm or smaller in the liquid cesium tungsten oxide is 30 to 40 wt %.

6. The antibacterial and heat-shielding composition of claim 1, wherein the antibacterial agent comprises zinc sulfide (ZnS).

7. A method for producing an antibacterial and heat-shielding window film, the method comprising steps of:
  (1) forming a laminated half-finished film by forming a pigment adhesive layer on one surface of a first base film and depositing a second base film on the pigment adhesive layer, followed by pressing with a laminating roller;
  (2) forming an antibacterial and heat-shielding hard coating layer by coating one surface of the half-finished film with an antibacterial and heat-shielding solution;
  (3) forming a UV-shielding adhesive layer by adhering a UV-shielding layer to an exposed surface of the antibacterial and heat-shielding hard coating layer; and
  (4) depositing and laminating a release layer onto a top surface of the UV-shielding adhesive layer;
  wherein the antibacterial and heat-shielding solution in step (2) contains:
    17.0 to 19.0 parts by weight of a monomer component composed of dipentaerythritol hexaacrylate and N,N-dimethylacrylamide;
    0.85 to 0.95 parts by weight of any one or more liquid compounds selected from the group consisting of diphenyl(2,4,6-trimethylbenzoyl) phosphine oxide, oligo[2-hydroxy-2-methyl-1-[4-(1-methylvinyl)phenyl]propanone], 2-hydroxy-2-methylpropiophenone, and 2,4,6-trimethylbenzophenone;
    0.35 to 0.40 parts by weight of 1-hydroxycyclohexylphenylketone;
    0.15 to 0.20 parts by weight of phenylbis(2,4,6-trimethylbenzoyl)phosphine oxide;
    0.04 to 0.06 parts by weight of 2-propenoic acid, butyl ester;
    50.0 to 78.0 parts by weight of a liquid heat-shielding agent; and
    2.0 to 2.5 parts by weight of an antibacterial agent.

8. The method of claim 7, wherein each of the first and second base films in step (1) is a highly transparent (PET) film.

9. The method of claim 7, wherein step (2) comprises:
  preparing the antibacterial and heat-shielding solution;
  forming an antibacterial and heat-shielding solution layer by coating one surface of the half-finished film with the antibacterial and heat-shielding solution by a microgravure coating method;
  hot-air-drying the formed antibacterial and heat-shielding solution layer by passage through a dryer; and
  UV-curing the hot-air-dried antibacterial and heat-shielding solution layer.

10. The method of claim 7, wherein the monomer component is a mixture of dipentaerythritol hexaacrylate and N,N-dimethylacrylamide mixed together at a weight ratio of 85 to 95:5 to 15.

11. The method of claim 7, wherein the liquid heat-shielding agent comprises one or more of a liquid antimony tin oxide in which solids having a particle size of 50 nm or smaller are nanodispersed, and a liquid cesium tungsten oxide in which solids having a particle size of 50 nm or smaller are nanodispersed.

12. The method of claim 11, wherein a content of the solids having a particle size of 50 nm or smaller in the liquid antimony tin oxide is 35 to 45 wt %.

13. The method of claim 11, wherein a content of the solids having a particle size of 50 nm or smaller in the liquid cesium tungsten oxide is 30 to 40 wt %.

14. The method of claim 7, wherein the antibacterial agent comprises zinc sulfide (ZnS).

* * * * *